United States Patent [19]

Tovagliaro

[11] 4,334,597

[45] Jun. 15, 1982

[54] BRAKE WEAR COMPENSATING DEVICE

[75] Inventor: Costantino Tovagliaro, Milan, Italy

[73] Assignee: Magnaghi Oleodinamica S.p.A., Milan, Italy

[21] Appl. No.: 54,702

[22] Filed: Jul. 5, 1979

[30] Foreign Application Priority Data

Jul. 10, 1978 [IT] Italy .............................. 25485 A/78

[51] Int. Cl.³ ............................................ F16D 65/52
[52] U.S. Cl. .............................. 188/71.8; 188/196 P; 192/70.25; 192/111 A
[58] Field of Search ........................ 188/71.8, 196 P; 192/70.25, 111 A

[56] References Cited

U.S. PATENT DOCUMENTS

| | | | |
|---|---|---|---|
| 2,746,254 | 5/1956 | Lucien | 188/196 P X |
| 2,817,419 | 12/1957 | Wolf | 188/71.8 |
| 3,032,144 | 5/1962 | Stanton | 188/196 P X |
| 3,064,768 | 11/1962 | Dotto | 188/71.8 |
| 3,115,220 | 12/1963 | Cagle | 188/196 P |
| 3,434,574 | 3/1969 | Barone | 188/196 P |
| 3,887,042 | 6/1975 | Dittinger et al. | 192/111 A X |

*Primary Examiner*—George E. A. Halvosa
*Attorney, Agent, or Firm*—Kurt Kelman

[57] ABSTRACT

A device for taking up wear in a disc brake assembly which is particularly suitable for aircraft comprises first and second spaced jaw members carrying a piston and cylinder actuating assembly operable by fluid pressure to displace friction linings and disc brakes towards one of the jaw members to compress the friction linings against the disc brakes and effect braking. The piston is in two telescoping parts and friction rings disposed therebetween normally retain the relative position of the two piston parts against the effect of a spring which operates on one of the piston parts to return the piston to a rest position. The displacement of this one piston part from the rest position is limited by an abutment and, in the event of this limited displacement being insufficient to effect braking, due to wear in the friction linings, the other piston part is displaced further by the fluid pressure against the effect of the friction rings to effect braking. On the return stroke of the piston, the piston parts retain their extended relative position so that the effective length of the piston is increased in correspondence to the wear of the friction linings and the operative stroke of the piston is maintained substantially constant as is the reaction time of the brake assembly.

1 Claim, 2 Drawing Figures

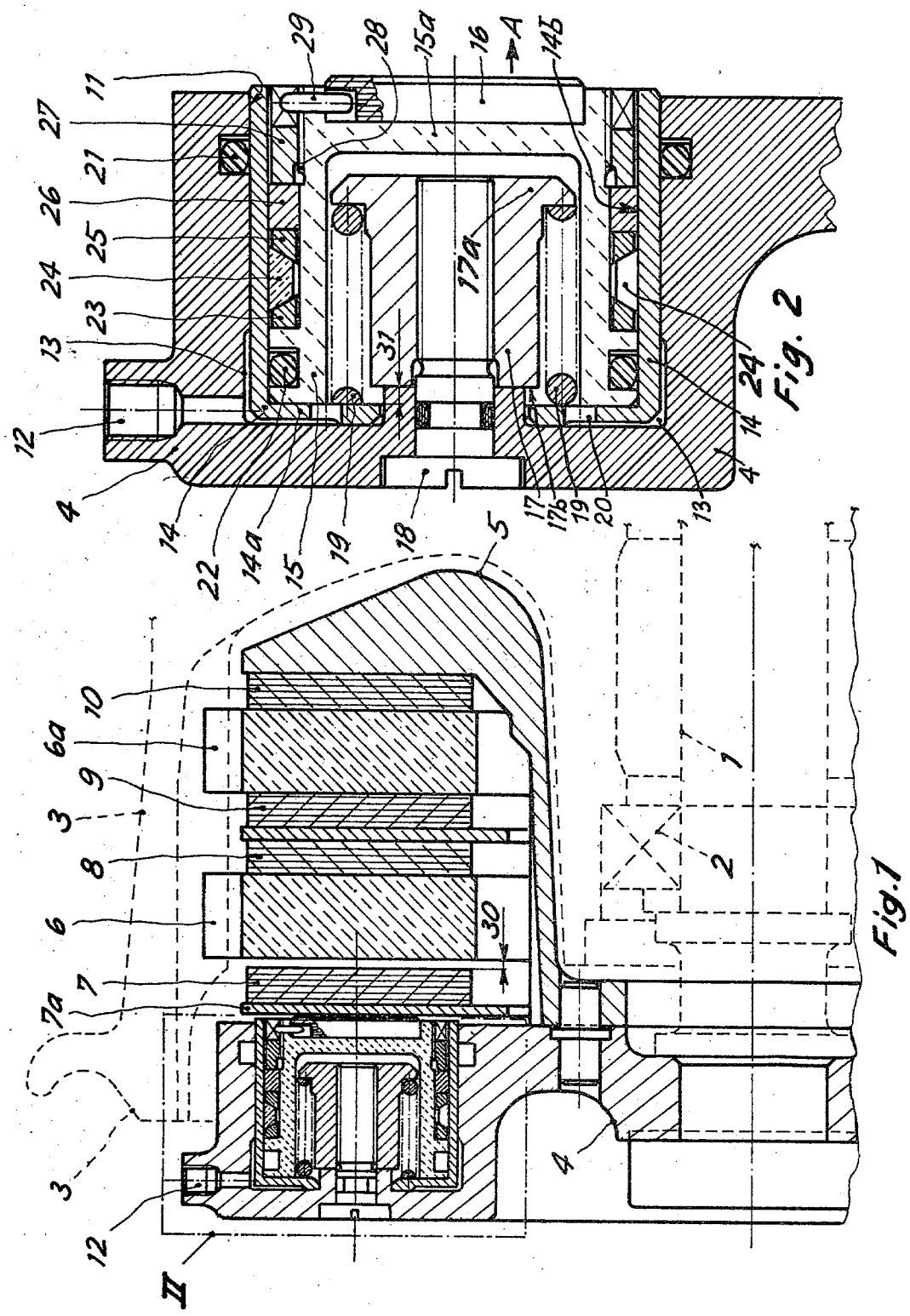

BRAKE WEAR COMPENSATING DEVICE

BACKGROUND OF THE INVENTION

This invention relates to devices for compensating for wear in a disc brake assembly and is particularly, but not exclusively, concerned with such devices for use in aeronautics.

Aircraft with wheeled undercarriages are generally equipped with mechanical brakes, normally of the disc type or multiple disc type, which act directly upon the wheels and are adapted to absorb both the energy produced during normal landing and also the energy of much greater magnitude which results from emergency braking in exceptional conditions.

In both these cases a very high braking capacity is required which may act for only a few seconds, but which should act in a continuous and efficient manner. It is extremely important, in view of the speed of the aircraft when landing, that the operation of the brake in response to the command of the pilot should be as rapid as possible and should remain substantially constant in spite of wear in the brake linings.

As a consequence of the very high capacity demanded, aircraft brakes are usually composed of a plurality of braking discs connected to the wheels for rotation therewith and disposed between friction linings connected to standard hydraulically operated pincers or jaws equipped with pistons on one side only.

Thus, for example, a brake with two discs requires four linings which grip the discs between them during braking and are subject to wear and to considerable heating.

Both the wear and the heat result in braking conditions which never remain the same with time and, in particular, the wear of the linings leads to differences of the order of several millimeters, at times even greater than ten millimeters, in the total thickness of the linings plus discs, as between the condition when the linings are new and the condition when the linings are worn, but nevertheless are still operational. In these cases the stroke that must be travelled by the pressure applying piston in order to ensure that the linings grip the discs must be such as to accommodate the wear in the linings in addition to the normal thermal expansions and the elastic movements of the assembly. Since the last two causes cannot be eliminated, the technical problem which arises consists of so arranging the pressure applying piston as to guarantee, at rest, only a minimum of play between the linings and the discs, such as to leave the discs and the wheel free while nevertheless taking account of the temperature to which the brake assembly is subjected at the end of braking, which temperature may indeed be quite high depending upon the use.

These technical problems which to some extent are in opposition are solved by a device according to the present invention, in a simple and effective manner and in such a way as to take account, not only of the wear of the linings, but also of the variations in temperature, expansion and elastic deformation to which the brakes are subjected.

SUMMARY OF THE INVENTION

According to the present invention, a device for compensating for wear in a disc brake assembly comprises first and second spaced jaw members between which are disposed friction linings with disc brake members arranged therebetween, the friction linings and disc brake members being slidable between the jaw members, and a hydraulic piston and cylinder actuating assembly operable by a fluid under pressure to displace and compress the friction linings and disc brake members into braking engagement, the piston of the actuating assembly being comprised of two hollow relatively displaceable telescoping parts, one piston part having a limited axial displacement against the effect of a return spring and friction means being provided between the piston parts to prevent relative displacement therebetween until the one piston part has attained its limited axial displacement under the influence of an applied fluid pressure. More specifically, the invention provides a device for compensating for wear in a disc brake assembly comprising first and second spaced jaw members, friction linings disposed between the jaw members and slidable therebetween, disc brake members disposed between the friction linings and slidable between the jaw members, a cylinder fixed to said first jaw member, means for admitting fluid under pressure to the interior of said cylinder, a first hollow piston slidably mounted in said cylinder for displacement under the influence of said fluid pressure, means for admitting fluid under pressure from the interior of said cylinder to the interior of said first hollow piston, resilient means operable to oppose displacement of said first hollow piston under the influence of said fluid pressure to return said first hollow piston to an initial position upon release of said fluid pressure, abutment means engageable with said first hollow piston to limit the displacement thereof to a predetermined value under the influence of said fluid pressure, a second piston slidably mounted in said first hollow piston for displacement relative thereto under the influence of fluid under pressure admitted to the interior of the first hollow piston, friction means interposed between said first and second pistons operable to prevent displacement of said second piston relative to said first piston until said first hollow piston is displaced into engagement with said abutment means and means for transmitting the displacement of and the pressure applied to said second piston to said friction linings to urge said friction linings into engagement with said disc brake members to effect braking.

The first hollow piston is cup-shaped with a flat base and is loaded by a spring or the like which acts upon the flat base of the first piston in an axial direction to urge it towards the initial position in which the flat base of the first piston engages the base of the fixed cylinder and which operates to restore it to this position when the action of the pressurized fluid has stopped. The second piston is, however, free from axial loading when in the rest condition, although it is joined to the first piston by radial loads caused by preloadable friction means acting between the two pistons. Such friction means is, with advantage, provided by an open expandable bronze ring having opposed conical surfaces and loaded radially outwards, the load being provided by means which can be adjusted and calibrated upon assembly and which comprises thrust rings with similar conical surfaces and of a material having a co-efficient of expansion of the same order of magnitude as that of the first piston. The open friction ring is disposed about the periphery of the second piston so as to offer its larger cylindrical surface in contact with the internal wall of the first piston and is disposed between said two closed coaxial thrust rings, in contact with the conical surfaces and clamped between a fixed shoulder and a threaded ring nut of said second piston.

With advantage, the expandable ring has an outer cylindrical wall engaged with said interior wall of said first hollow piston and opposed conical faces extending inwardly towards the axis of said expandable ring, a separate thrust ring is disposed on each side of said annular ring, each thrust ring having a conical face engaged with a corresponding one of said conical faces of said expandable ring and adjustable means is provided to apply a load to said thrust rings to control the expansion of said expandable ring and the frictional effect thereof.

In the installation phase, the open friction ring is loaded so as to open and expand by means of the axial ring nut and the two conical steel thrust rings, so as to generate friction against the internal wall of said first cylinder which gives rise to an axial force adapted to hold the second piston with respect to the first up to a predetermined limit, axial force tending to urge the pistons apart which axial force should be chosen to be higher than the axial load produced by the restoring spring acting upon the first piston. The first piston can, nevertheless, execute a limited axial stroke slightly greater than the sum of the initially existing plays, that is to say with new linings, so that at the instant at which fluid is introduced under pressure for braking, the internal or second piston is thrust axially outwards and, on account of the friction ring, takes with it also the external or first piston by overcoming the action of said restoring spring, the two pistons thus moving together like a single piston.

If, due to wear, the play between the friction linings and the braking discs increases to a value requiring a piston stroke greater than the available limited stroke to effect braking, then, when the two pistons have together executed the limited stroke, the first piston is stopped by abutment means and the second piston overcomes the predetermined holding frictional force between the two pistons and moves outwards relative to the first piston by the amount necessary to eliminate the plays which have developed and to compress the package of friction linings and disc brakes and executes the braking action, thereby assuming an extended position with respect to the first piston.

When the action of the pressurized fluid in the brake cylinder ceases, both the pistons return to the initial rest position like a single body under the action of the restoring spring without varying the relative position between these pistons adopted during the preceding braking operation. The first and second pistons have therefore, in effect, expanded. At the next braking operation the two pistons move under the action of the pressurized fluid as a single body for the entire distance allowed by the limited stroke of the first piston, executing the braking action and, if necessary, the second piston advances further alone, so as to take up any new play resulting from the wear which occurs during the braking action itself. Consequently, according to this invention, the stroke necessary for carrying out the braking action, whether with new linings or with worn linings, always remains the same and thus the braking time at the disposal of the pilot remains the same. The first and second pistons effectively provide a single piston composed of two telescoping parts, the axial length of this single piston being automatically adjusted to compensate for wear in the friction linings so that the operative stroke of the single piston to effect braking remains substantially constant.

In cases of notable temperature variations caused either by the external environment or by overheating as a result of prolonged or emergency action, the axial variations of the pistons are essentially very small, whereas the circumferential variations are large. Since the conical thrust rings are of the same material (in practice steel) as the first piston, the same circumferential variation (expansion or contraction) which said first piston undergoes is also undergone by said two conical thrust rings which act in consequence, in the same sense, upon the open expandable friction ring and maintain unchanged the radial thrust of the friction ring against the first piston and hence the frictional force provided between the two pistons.

The device is therefore substantially insensitive to variations in temperature, even of a notable amount.

These and other characteristics will become apparent from the detailed description given below of a drive assembly for multiple disc brakes for aeronautical use, illustrated by way of example in the attached drawing.

BRIEF DESCRIPTION OF DRAWINGS

FIG. 1 shows, in axial section, one half of a brake assembly for an aircraft wheel, and FIG. 2 shows, enlarged, the detail contained within the square II of FIG. 1 of the pressure device.

Referring to FIG. 1, reference 1 indicates an axle of an aircraft undercarriage, carrying idling on the bearing 2 a wheel 3 and, integral with the axle, two spaced jaw members 4 and 5 of known type for disc brakes. Brake discs 6-6a of known type are mounted on the wheel and are axially displaceable but keyed against rotation relative to the wheel. The brake discs 6-6a are located between friction linings 7, 8, 9 and 10 disposed on both sides of each disc. As is known, in brakes of the type indicated, there are disposed in alignment with the axis of the friction linings (generally of limited dimensions, and known as "pastilles") one or more hydraulic pressure assemblies adapted for pressing the pastilles and discs against the jaw 5 so as to grip the brake discs. In accordance with the present invention such a hydraulic pressure assembly (contained within the rectangle II of FIG. 1 and shown to a larger scale in FIG. 2) comprises a fixed cylinder 11 formed in the jaw member 4, into which pressurized fluid is admitted through inlet 12 which communicates with an annular cavity 13 (FIG. 2) for distributing the pressure over the entire cylinder. Inside the cylinder 11 there slides a first pot-shaped piston 14 terminating in an open annular flat surface 14a and having an internal cylindrical surface 14b. On the latter surface there slides a second piston 15, also pot-shaped, coaxial with but inverted with respect to the first piston, terminating in a disc-shaped closed surface or end 15a and carrying coaxially a pastille 16 of insulating material intended for making contact with the support 7a of the first lining 7. Coaxially within the fixed cylinder 11 is a sleeve 17 held in position by a screw 18 and having a head 17a against which one end of a preloaded restoring spring 19 bears, the other end of the spring bearing against the base 14a of the first piston 14. At the end opposite to the head 17a the sleeve is formed with an abutment shoulder 17b which is engaged by the base 14a of the piston 14 when the piston 14 has travelled a predetermined limited distance, referenced 31 in FIG. 2, which distance is designed to have a value slightly exceeding the sum of the initial plays between the linings and the brake discs, with new linings. The base 14a is formed with openings 20 to admit fluid under pressure to the interior of the pistons 14 and 15 while sealing at the various cylindrical surfaces is assured by sealing rings 21-22 of known type.

The cylindrical wall of the second piston 15 has an external portion of reduced diameter to leave an annular gap between the pistons 14 and 15 in which are inserted, in succession, a closed thrust ring 23, an open expandable ring 24, a further closed thrust ring 25, an intermediate thrust element 26 and a threaded ring nut 27 which threaded nut engages an external thread 28 of the piston 15 and which is locked in position by a cotter pin 29. As can be seen from the enlarged FIG. 2, the open expandable friction ring 24 has its opposed coaxial faces of conical form converging towards the axis, while the thrust rings 23 and 25 are in contact with said friction ring with similar conical surfaces. It can also be seen that the thrust rings 23 and 25 have radial clearances towards both the pistons, while the friction ring 24 engages the internal surface 14b of the piston 14 and is radially spaced from the piston 15. In addition, it is of advantage for the thrust rings 23, 25 to be of the same material, preferably steel, as the piston 14, while the piston 15 and the intermediate ring 26 may be of aluminium alloy or some other material.

The method of operation is as follows: let us assume that the assembly shown in FIG. 1 is in the condition as first installed with new linings and minimum play and in the rest condition before its first use. The total play 30, indicated in FIG. 1 for convenience as being all at one place, is in fact due to the sum of all the plays existing initially between the linings, the brake discs and the jaw members and, although very small with new linings, can become appreciable (even greater than 10 mm) with wear of the friction linings, so that the drive or actuating pistons, at the instant of braking, would have to traverse said space under no load and with a comparative delay before the braking action commenced. At the assembly stage, moreover, the threaded nut 27 which, by means of the thrust element 26 and the conical thrust rings 23 and 25, causes the open friction ring 24 to expand, thus causing it to engage the internal surface 14b of piston 14, is tightened in such a way that the axial frictional force of retention between the two pistons 14 and 15 is greater than the axial force exerted by the restoring spring 19 on the piston 14.

When pressurized fluid flows through inlet 12 into the cylinder 11, both the pistons 14 and 15 move outwards as a single body in the direction of arrow A, thus acting upon the friction linings and the brake discs to displace these towards the fixed jaw member 5 and to effect the braking action. In fact, the pressure of the fluid acts upon the entire surface of the internal piston 15 and upon the corona, corresponding to the thickness of the piston 14, but both pistons move as a single body, even though the external piston 14 is loaded in the opposite direction by the restoring spring 19 because, as already stated, the friction between the ring 24 and the piston 14 is initially adjusted so as to create an axial retaining force greater than that produced by spring 19. In view of the fact that the distance 31 between the base 14a of the piston 14 and the abutment shoulder 17b of the fixed sleeve 17 is greater than the total play 30 between the friction linings, discs and pincers, as considered in the initial conditions, the braking operation can be carried out without relative displacement between the piston 15 and the piston 14. At the end of braking, when the fluid pressure in the brake cylinder 11 is relieved, both the pistons 14 and 15 are brought back as a single body into the rest position by the restoring spring 19. Progressively as wear takes place in the friction linings, the total play 30 increases and becomes greater than the distance 31 which defines the limited stroke of the piston 14, so that when pressurized fluid is supplied into the cylinder 11, the two pistons 14 and 15 initially advance together as a single body until the base 14a of the piston 14 engages the abutment shoulder 17b thus stopping further displacement of the piston 14. The internal piston 15 continues to be displaced outwardly (in direction of arrow A) by the fluid pressure overcoming the predetermined friction between the two pistons 14 and 15 due to the friction ring 24 as already explained. Such a continued movement of the piston 15 causes braking by compressing the discs 6, 6a between the linings from 7 to 10 against the jaw 5. At the completion of the braking operation the piston 15 is therefore in advance of the piston 14 by the amount resulting from the wear to which the linings have been subjected. The piston 15 remains held in this position relative to the piston 14 by the frictional effect of the ring 24 and, when the fluid pressure in the cylinder 11 is removed, the assembly of the two pistons 14 and 15 is brought back to the initial position by the restoring spring 19 without further relative displacement between the pistons. When the rest position has been reached, the internal piston 15 is now in advance or extended with respect to the piston 14 by the amount effectively corresponding to the increased play resulting from the wear, while there still remains between the piston 15 and the friction linings a degree of play substantially equal to that designed for the initial conditions with new linings. At the next braking, the assembly of the two pistons will again traverse the stroke distance 31, carrying out the braking action. If, during such braking, further wear of the linings occurs, the internal piston 15 will be thrust further outwards by the amount corresponding to such further wear, arriving at the end of the braking operation in a position still further extended with respect to the piston 14.

Consequently, braking will always take place with the same stroke 31 of the piston 14 even when the linings are worn. In the case of wide temperature variations resulting, for example, from the environment, such as in tropical or northern zones, or caused by local overheating resulting from emergency or prolonged braking, it is found that the piston 14 and the conical rings and the piston 15 are subject to variations in dimensions proportional to the variations in temperature.

If one considers the friction complex composed of the rings 23, 24 and 25 clamped between the piston 15 and ring nut 27, it is found that whereas the axial variations are very small and therefore insignificant, the circumferential variations are, by contrast, large and could lead to variations in friction between the ring 24 and the internal surface 14b, thus modifying the initial calibration conditions. It is preferred therefore to make the conical rings 23 and 25 of the same material (in practice steel) as the piston 14 so that the dimensional variations are substantially the same with the consequence that the open expandable friction ring 24 will be constrained correspondingly to change its dimensions and remain in contact with the internal surface 14b with the same radial thrust as was provided at installation. Such a friction complex is, therefore, substantially insensitive to temperature variations, even though these may be quite large. With a device according to this invention, the pilot can always rely upon the same immediate action of the brakes, even when considerable wear of friction linings has occurred and when the ambient conditions of use can vary widely.

It will be understood that numerous variants of a constructional nature can be applied to that which has been described above and illustrated purely as an example, in particular in regard to the means for achieving a radial frictional action between one piston and the other sufficient for retaining the second piston at the position reached during the preceding braking action, without thereby departing from the scope of the present invention.

What is claimed is:

1. In a disc brake comprising two brake jaws and a hydraulic brake actuating system including a cylinder fixed to one of the brake jaws, a first cup-shaped piston slidably mounted in the cylinder, the first piston having a ring-shaped bottom, a second cup-shaped piston slidably mounted in the first piston, the second piston having a closed bottom opposite the ring-shaped bottom of the first piston, and resilient means arranged between the first piston and the cylinder, the resilient means being biased to hold the first piston normally at a rest position: a brake wear compensating device which comprises a friction means mounted between the first and second pistons and effective to hold the second piston substantially stationary with respect to the first piston by an axial loading force exceeding the bias of the resilient means, the friction means consisting of a pair of closed rings, the closed rings having radially inwardly tapering faces facing each other, an open ring arranged between the closed rings and having opposite faces in contact with the radially inwardly tapering faces of the closed rings whereby the open ring is axially wedged between the closed rings, the open ring having a first cylindrical surface facing the first piston and a second cylindrical surface facing the second piston, the first cylindrical surface being greater than the second cylindrical surface, and means for pressing the closed rings axially together under said axial loading force for radially expanding the open ring therebetween, the first piston and the closed rings being of a material having the same thermal expansion coefficient and the closed rings defining a radial clearance with the first and second pistons.

* * * * *